E. BEEMAN.
Wick Mover.
No. 40,234.  Patented Oct. 13, 1863.
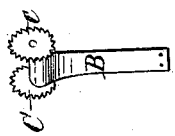
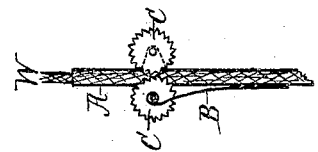
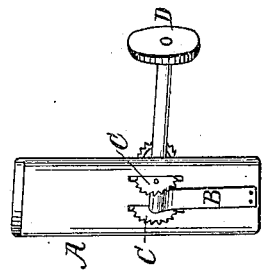
Witnesses
D. Tripp
G. P. Tripp

UNITED STATES PATENT OFFICE.

EPHRAIM BEEMAN, OF OWEGO, NEW YORK.

IMPROVEMENT IN WICK-MOVERS.

Specification forming part of Letters Patent No. 40,234, dated October 13, 1863.

*To all whom it may concern:*

Be it known that I, EPHRAIM BEEMAN, of Owego, in the county of Tioga, State of New York, have invented an Improvement in Wick-Movers for Kerosene and other Lamps, reference being had to that kind of mover that is operated by a thumb screw or wheel carrying toothed or serrated wheels taking into the wick; and I do hereby declare that the following is a full and exact description thereof, reference being had to the accompanying drawings, and to the letters of reference marked thereon.

The nature of my invention consists in adding the spring B, carrying the toothed wheels C C on a short axis at its upper end, said wheels setting exactly opposite to the toothed wheels carried upon the axis of the thumb-wheel D. The wheels C C act as pressure-rollers upon the wick W, thus taking off all friction upon the inner wall of the tube A.

To enable others skilled in the art to make and use my invention, I will proceed to describe its construction.

The wheels C C are struck with the same dies as the wick-mover. The spring B is of rolled brass, the end being bent around to receive the axis of the rollers C C. The spring B is soldered to the wick-tube A.

What I claim as my invention, and desire to secure by Letters Patent, is—

The application of the spring B and wheels or rollers C C to the wick-tube A, acting in such a manner as to take off the friction of the wick upon the inside of the wick-tube and operate wicks of various thicknesses with equal ease and certainty.

EPHRAIM BEEMAN.

Witnesses:
D. TRIPP,
G. P. TRIPP.